Nov. 29, 1960   A. SZLACHETKA   2,962,291
SELF-CLAMPING THREE-JAW CHUCK

Filed April 14, 1959   4 Sheets-Sheet 1

INVENTOR
ANTON SZLACHETKA
BY
ATTORNEY.

Nov. 29, 1960 A. SZLACHETKA 2,962,291
SELF-CLAMPING THREE-JAW CHUCK
Filed April 14, 1959 4 Sheets-Sheet 2

INVENTOR
ANTON SZLACHETKA
BY
ATTORNEY

Nov. 29, 1960 A. SZLACHETKA 2,962,291
SELF-CLAMPING THREE-JAW CHUCK

Filed April 14, 1959 4 Sheets-Sheet 3

INVENTOR
ANTON SZLACHETKA
BY *Ernest J Montague*
ATTORNEY.

United States Patent Office 2,962,291
Patented Nov. 29, 1960

2,962,291

SELF-CLAMPING THREE-JAW CHUCK

Anton Szlachetka, Duisburg, Germany, assignor to Fa. Gustav Espey G.m.b.H., Duisburg, Duisburg, Germany, a corporation of Germany Filed Apr. 14, 1959, Ser. No. 806,239

Claims priority, application Germany June 7, 1958

12 Claims. (Cl. 279—114)

The present invention relates to a self-clamping three-jaw chuck with radially guided jaws being pressed against the workpiece by means of a spiral curve by turning two chuck parts against each other.

In the known three-jaw chucks the clamping and releasing of the workpiece always takes place when the drive spindle, carrying the chuck, is stationary, no matter whether the jaws are operated by hand or hydraulically. So called self-clamping three-jaw chucks have a threaded ring located on their outside by which the jaws may be adjusted by turning it around the axis of the chuck. However, when the machine is running, these chucks are adapted to clamp a workpiece only by manually exerting a braking action to the outside located threaded ring. Releasing a workpiece once it has been clamped is not possible while the machine is running. Besides this, the chucks provided with threaded rings have the disadvantage that the threads wear slowly, progressively causing inaccurateness in clamping and centering of the workpiece as the wear increases.

It is, therefore, one object of the present invention to overcome these disadvantages by providing a self-clamping three-jaw chuck having radially guided jaws, each jaw being pressed against the workpiece by means of a spiral curve by turning two chuck parts against each other, which chuck parts not only clamp workpieces while the machine is running, but also releases them again while the machine is running.

It is another object of the present invention to provide a self-clamping three-jaw chuck, the jaws of which are guided in a ring which is arranged freely rotatably in the chuck housing fixedly connected to the drive spindle, and which by means of a spring pressure is held in contact with the spiral curves provided on a member rotating with the housing. Thereby it is possible to use the chuck for automatic turning and milling machines with a constantly rotating spindle, and to continuously chuck and release new workpieces. Threads and other types of gear members, such as bevel gears etc., which are commonly used in known chucks, and which tend to wear rather rapidly are thereby avoided. If a workpiece is pressed in an axial direction against the jaws of the rotating chuck, the rotatably journalled ring within the housing is retarded by a braking action, whereby the jaws move and contact the spiral surfaces, rotating with the housing, with one of their circumferential surfaces, by means of which they are forced against the workpiece.

With these and other objects in view, which will become apparent in the following detailed description, the present invention will be clearly understood in connection with the accompanying drawings, in which.

Figure 2:
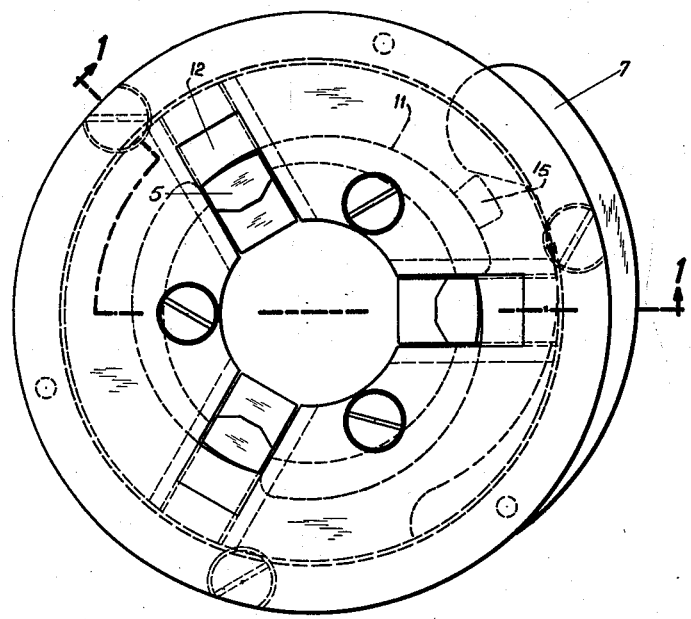
Fig. 2 is a plan view of the chuck.
Figure 1:
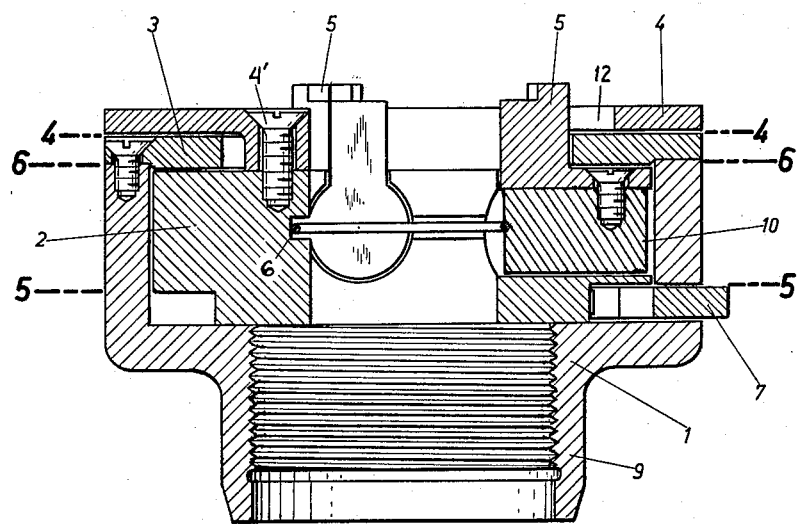
Figure 1 is a longitudinal axial section of a first embodiment of the invention along the lines I—I of Fig. 2.
Figure 4:
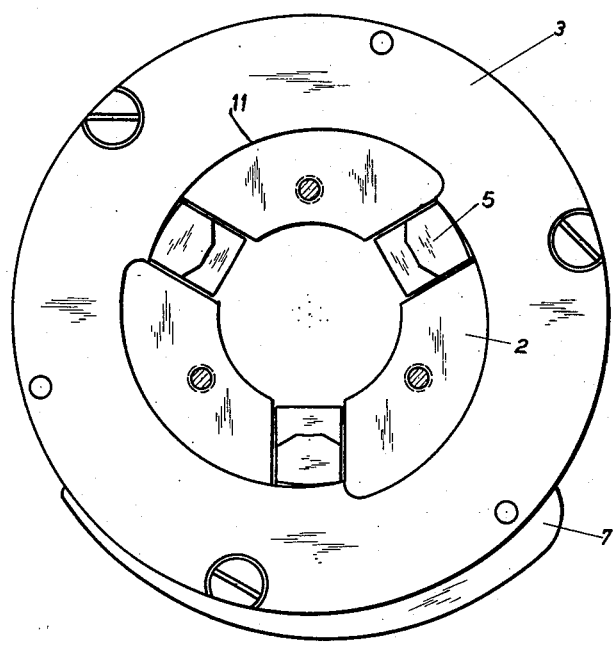
Fig. 4 is a cross-section along the lines IV—IV of Fig. 1.
Figure 3:
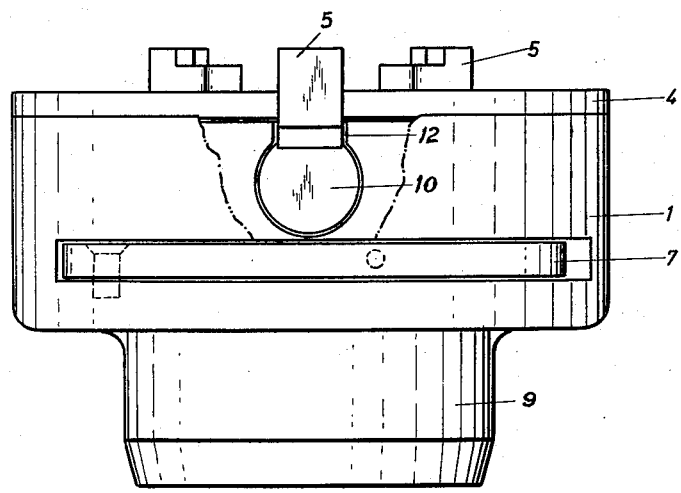
Fig. 3 is a side view with part of the housing wall broken away.

Two embodiments of the self-locking three-jaw chuck according to the invention are shown by way of example only, the jaws locking towards the inside, and which are adapted to be mounted on a spindle of an automatic turning machine which is revolving in a left-hand direction.

Referring now to the drawings, and in particular to Figs. 1 to 6, a chuck housing 1 is provided on its rear side with a boss 9, having an interior thread by means of which it is connected to a lathe spindle. Within the housing 1 is rotatably arranged a ring 2 which serves to guide three sliding parts 10 displaceable in an axial direction. Each of said sliding parts 10 carries on its upper surface one of the jaws 5. The sliding parts 10 are acted upon by a ring shaped spring arranged on the inside of the sliding parts 10 which presses the jaws 5 by means of the sliding parts 10 against one of the three equal spiral surfaces 11 (Fig. 4) which are limited by the inner opening of a ring disc 3 which is fixed to the housing 1 by screws, and in which the passage steps join each other. The face of the housing 1 is closed by a ring plate 4, which is screwed to the ring 2 by means of screw bolts 4' and is provided with slots 12 through which the jaws 5 extend.

If the chuck is intended to grip externally, the spiral surface should, instead of being arranged on a ring disc 3, be arranged on a core member (not shown) located on the inside of the jaws 5 and being fixedly connected to the housing 1. The jaws 5 should be kept in contact with the spirally shaped outer circumferential surface of said core member by a helical spring placed around the outside of said sliding parts 10.

It is to be understood, that the spiral surfaces 11 for an internally gripping chuck are so arranged, that they increase in distance from the axis of the chuck, in the direction of rotation, while for an externally gripping chuck they decrease their distance to the axis of the chuck in the direction of rotation.

Figure 5:
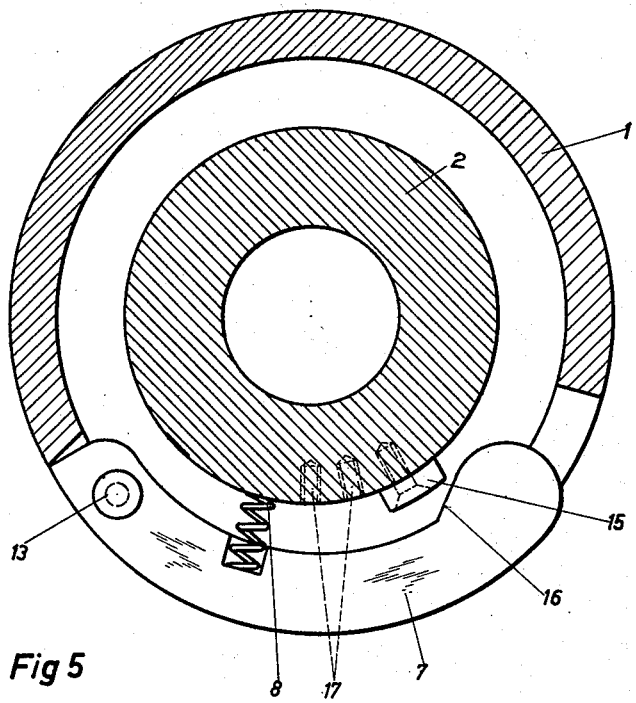
Fig. 5 is a cross-section along the lines V—V of Fig. 1.
Figure 6:
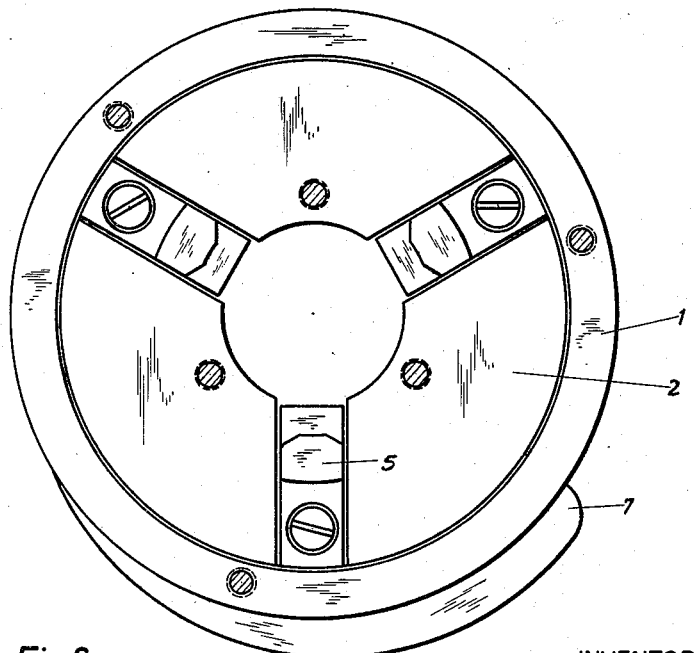
Fig. 6 is a cross-section along the lines VI—VI of Fig. 1.

A catch 7 is pivoted against the pressure of a spring 8 about a pivot 13, disposed parallel to the axis of the chuck (Fig. 5). This catch 7, serving to release a chucked workpiece, extends with its outside circumference projecting over the outside circumference of the housing 1, and is provided with a slanting surface 16 which contacts a nose 15 fixed to the outside circumferential of the ring 2. The nose 15 may be inserted in one of three bores 17 provided in the ring 2 according to the circumference of the workpiece to be worked. However, it is possible without any difficulty to arrange the nose 15 on the ring 2 in such a way, that it may be adjusted gradually over the circumference of the ring 2.

Figure 7:
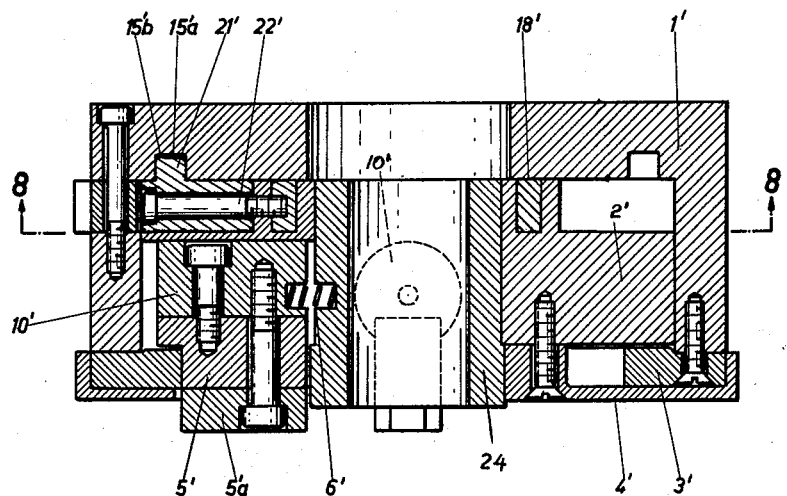
Fig. 7 is a longitudinal axial section of a second embodiment of the present invention.
Figure 8:
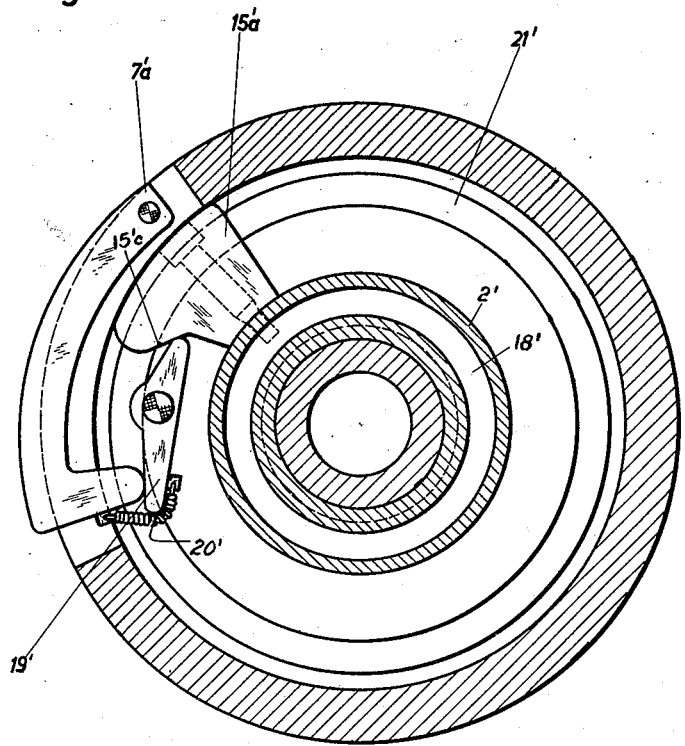
Fig. 8 is a cross-section of the same chuck taken above the catch.

Referring now to Figs. 7 and 8, a three-jaw chuck is shown within a chuck housing 1' of which a rotatable ring 2' is journalled, three jaws 5', and 5'a are radially guided by means of cylindrical members 10' within the ring 2'.

In the chuck housing 1' is a certain catch 7'a, which serves to rotate the ring 2' when releasing a chucked workpiece, and is pivotally arranged about an axis parallel to the chuck. The catch 7'a, extending with its free end projecting from the circumference of the housing 1', acts with an inner extension on the larger arm of a double acting lever 19'. The shorter arm of this double acting lever 19' contacts an inwardly directed slanting surface 15'c of a projection 15'a which is fastened to the outer circumference of the rotatable ring 2'. This fastening is achieved by means of a clamping ring 18' which is inserted in a groove at the bottom of the ring 2', and to which the projection 15'a is connected by a screw 22', which also extends through a slot in the ring 2. Thereby the projection 15'a may be adjusted in a gradual manner around the circumference of the ring 2'. The releasing device may be adapted to workpieces of any diameter in a very finely adjustable manner. In order to avoid any pivoting of the projection 15'a, it is laterally guided in a groove 15'b of th housing 1'.

The catch 7'a and the double arm lever 19' are connected by a tension spring 20' which is placed over the free end of the longer arm of the lever 19' thus holding the catch and the lever in position. The cover 4' of the housing 1' which is screwed to the rotatable ring 2' and through which the jaws 5', 5'a extend in radial slots, has its outer edge projecting over the circumferential surface of the housing 1.

The chucking effect is increased by the pressure of the working tools exerted on the workpiece. A chuck of this type can also be arranged for internal as for external gripping. If the chuck is intended to grip internally, the surfaces running spirally around the axis of the housing limit the inner opening of a ring disc surrounding the jaws, the distance of said spiral surfaces from the axis of the chuck increasing in the direction of rotation of the chuck. If the chuck is intended to grip externally, the surfaces running spirally around the axis of the housing from the outer circumferential surface of a member arranged within the jaws, reduces the distance of said spiral surfaces from the axis of the chuck in the direction of rotation of the chuck.

A catch 7 and 7'a, respectively, pivotally arranged on an axis parallel to the axis of the housing 1 or 1' near its circumference, projects over the circumference of the housing 1 or 1' which, with its inner inclined surface is pressed against the action of a spring against a nose projecting from the circumference of the rotatably journalled ring within the housing, and serves in both cases to release the workpieces being gripped by the chucks. Thus, that portion of the catch, which is being pressed from the outside towards the circumferential surface of the rotating chuck, is pressed inwardly, and acts with its inc'ined surface on the nose of the ring 2 or 2', turning said ring in relation to the housing 1 or 1', and also to the spiral surfaces 11 opposite to the tightening direction, so that the spring acting on the jaws 5 or 5' may push the latter away from the workpiece.

As the inclined surface on the catch 7 or 7'a may only have a limited length the amount about which the ring may be turned to release the workpiece is comparatively small. Yet, this amount is sufficient to release with reliability a chucked workpiece from the chuck, if the nose and the inclined surface are positioned correctly, relative to each other. However, in order to make the chuck suitable for chucking and releasing workpieces of considerably different diameters, it is of advantage to arrange said nose adjustably on the circumference of the ring, so that it may be adjusted to the correct position to the inclined surface of the catch, according to the diameter of the workpiece to be worked.

It is advantageous to fasten each of the jaws 5 or 5'a on a sliding part which is guided in a radially directed bore of the housing 1 or 1'. In order to make the chuck adaptable to workpieces of considerably differing diameters, the fixing means may be construed in such a way, that the jaws 5 and 5'a may be fixed to the sliding parts at different distances from the axis of the chuck. Furthermore it is advisable to close the housing on its face side by a disc 4 or 4' having radially directed slots through which the jaws 5 or 5'a extend, said disc being fixedly connected to the ring 2 or 2' which is arranged rotatably in the housing 1'. By this means not only the parts inside the housing are protected against dirt entering, especially turning ships, etc., but also the chucking operation may be assisted by manually applying a braking effect on said disc, if the pressure exerted on the jaws by the newly set up workpiece should be insufficient to brake the ring carrying the jaws.

Experience has shown, that the chucking pressure in a chuck of the described type which is intended to be used on a lathe, becomes greater the more the cutting pressure increases, i.e. the harder the material of the workpiece, and the catch must also be pivoted with a relatively strong force in the direction of the housing axis. In order to reduce, on the one hand, the forces necessary to release a chucked workpiece, and on the other hand, to improve the adaptability of the chucking range to different diameters of the workpiece, the catch advantageously does not directly act on the extension on the rotatable ring, but on a longer arm of a double acting lever which is pivoted within the chuck housing about an axis parallel to the axis of the catch, the shorter arm of which contacts an inwardly directed slanting surface arranged on the projection of the rotatable ring. By interposing the double acting lever with differing arm lengths with the catch acting on the longer arm, a ratio is attained, on account of which the force required to actuate the rotatable ring is reduced.

In order to adapt the chuck to different diameters of the workpiece, the projection is suitably arranged in a gradually adjustable manner over the circumference of the ring 2 or 2'. This is achieved in a simple manner in that the said projection is connected to a clamping ring, placed in a bottom groove of the rotatable ring by means of a screw extending through slots of the rotatable ring 2 or 2'. As the projection of the rotatable ring 2 or 2' in the described arrangement must project over the double acting lever 19', i.e. in a relatively greater axial direction over the circumference of the rotatable ring 2', it is advisable to make it adaptable to take up the pressure acting on it when releasing a workpiece by means of guiding it additionally with a lower projection in a concentrically arranged ring groove provided in the bottom of the chuck housing 1'.

In order to facilitate the chucking of workpieces while the lathe is running, it is advisable to let the housing cover 4 or 4', which is connected with the rotatable ring 2 or 2', and through which the jaws project towards the outside, project over the circumferential surface of the housing 1 or 1'. By this means it is possible to effect a braking action on said cover 4 or 4' by a laterally acting pressure. Thus the operator is not endangered by the projecting jaws 5 or 5'a, as is the case, if a cover 4 or 4', not extending over the circumference of the housing 1 or 1', is braked by a pressure acting in a facial direction on the housing.

While I have disclosed several embodiments of the present invention, it is to be understood that these embodiments are given by example only and not in a limiting sense, the scope of the present invention being determined by the objects and the claims.

I claim:

1. A self-clamping, three-jaw chuck with radially guided jaws comprising a chuck housing, a drive spindle, said chuck housing being fixedly connected to said drive spindle, a ring freely rotatable in said chuck housing and guiding said jaws, and a member rotating with said chuck housing and having a spiral curve co-ordinated to each of said jaws, and spring means causing engagement of each of said jaws with the corresponding one of said spiral curves.

2. The self-clamping, three-jaw chuck, as set forth in claim 1, wherein said member comprises a ring disc surrounding said jaws and having spiral surfaces disposed spirally relative to the longitudinal axis of said chuck housing and defining the inner opening of said ring disc surrounding said jaws, and said spiral surfaces increasing in distance from the longitudinal axis of said chuck housing in the direction of rotation.

3. The self-clamping, three-jaw chuck, as set forth in claim 1, wherein said member comprises a core member disposed within said jaws and the outer circumferential surface of said core member being formed by said spiral surfaces spirally disposed relative to the longitudinal axis of said chuck housing, and said spiral surfaces decreasing in distance from the longitudinal axis of said chuck housing in the direction of rotation.

4. The self-clamping, three-jaw chuck, as set forth in claim 1, which includes a catch disposed within said chuck housing adjacent the outer circumference of the latter, and said catch being pivotally mounted upon an axis disposed parallel to the longitudinal axis of said chuck housing and projecting over the outer circumference of said chuck housing, said catch having a slanting surface and said ring having a nose projecting from the circumference of said ring and disposed opposite said slanting surface of said catch.

5. The self-clamping, three-jaw chuck, as set forth in claim 4, which includes means for adjusting said nose around the circumference of said ring.

6. The self-clamping, three-jaw chuck, as set forth in claim 4, which includes a double-armed lever pivotally mounted in said chuck housing on an axis parallel to the axis of said catch, said double-armed lever having a longer arm and a shorter arm, said catch acting on said longer arm, said ring having a projection and the latter forming an inwardly directed slanting surface, and said shorter arm of said double-armed lever engaging said inwardly directed slanting surface.

7. The self-clamping, three-jaw chuck, as set forth in claim 6, wherein said projection of said ring is gradually adjustable around the circumference of said ring.

8. The self-clamping, three-jaw chuck, as set forth in claim 7, wherein said ring has a bottom groove and a clamping ring received in said bottom groove, and a screw connecting said projection with said clamping ring, said ring having a slot and said screw extending through said slot.

9. The self-clamping, three-jaw chuck, as set forth in claim 7, wherein said chuck housing has a concentric ring groove, and said projection has an extension received in said concentric ring groove and providing an additional guide for said projection.

10. The self-clamping, three-jaw chuck, as set forth in claim 1, which includes a cover for said chuck housing and said cover extending with its outer edge over the circumference of said chuck housing.

11. The self-clamping, three-jaw chuck, as set forth in claim 1, wherein said ring has three radial bores, sliding parts are guided in said radial bores, and said jaws are mounted on said sliding parts.

12. The self-clamping, three-jaw chuck, as set forth in claim 1, which includes a disc closing said chuck housing at its face side, said disc being fixedly connected to said ring and provided with radially directed slots adapted to receive said jaws.

References Cited in the file of this patent

UNITED STATES PATENTS

| | | |
|---|---|---|
| 1,263,894 | Hottinger | Apr. 23, 1918 |
| 1,350,746 | Spillmann | Aug. 24, 1920 |
| 1,442,107 | Vernaz | Jan. 16, 1923 |